July 7, 1931.  W. WUERFEL  1,813,792
PISTON RING
Filed Sept. 9, 1930  2 Sheets-Sheet 2
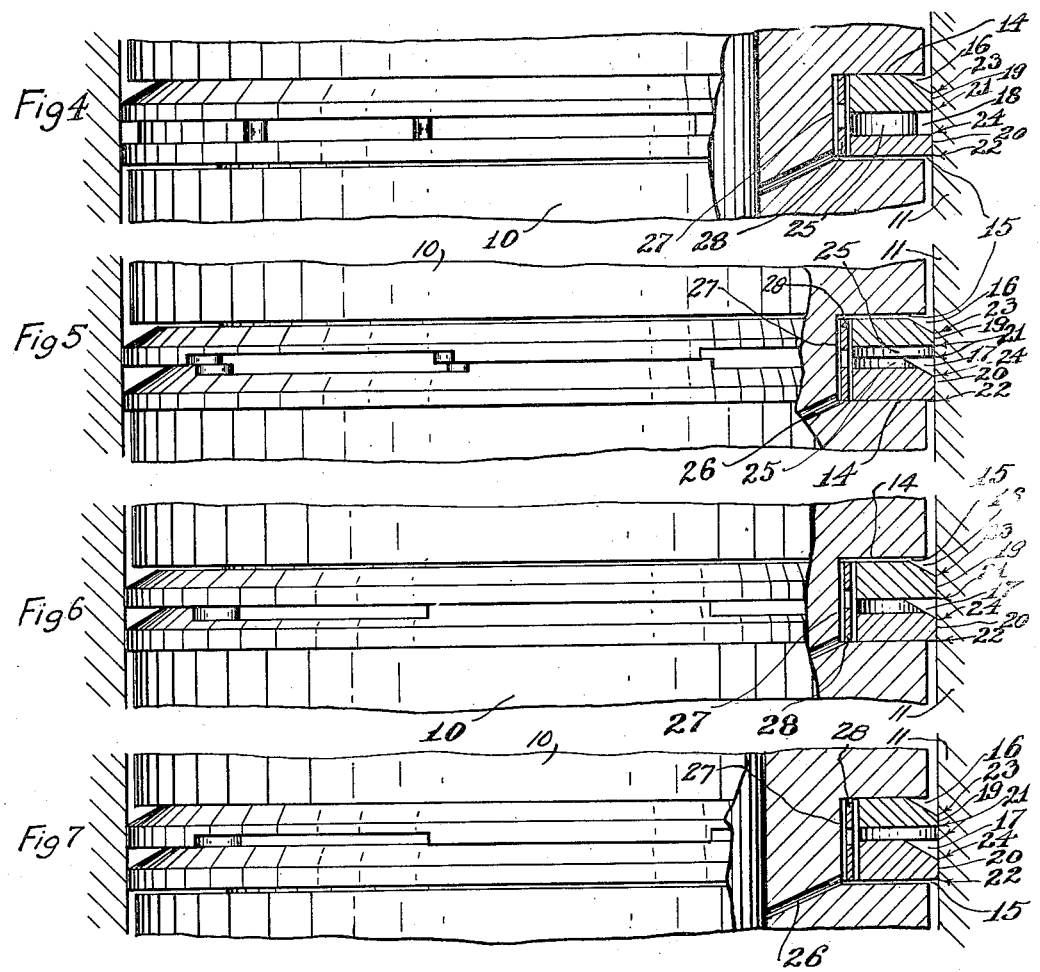
INVENTOR
WILLIAM WUERFEL
BY
ATTORNEY Patented July 7, 1931

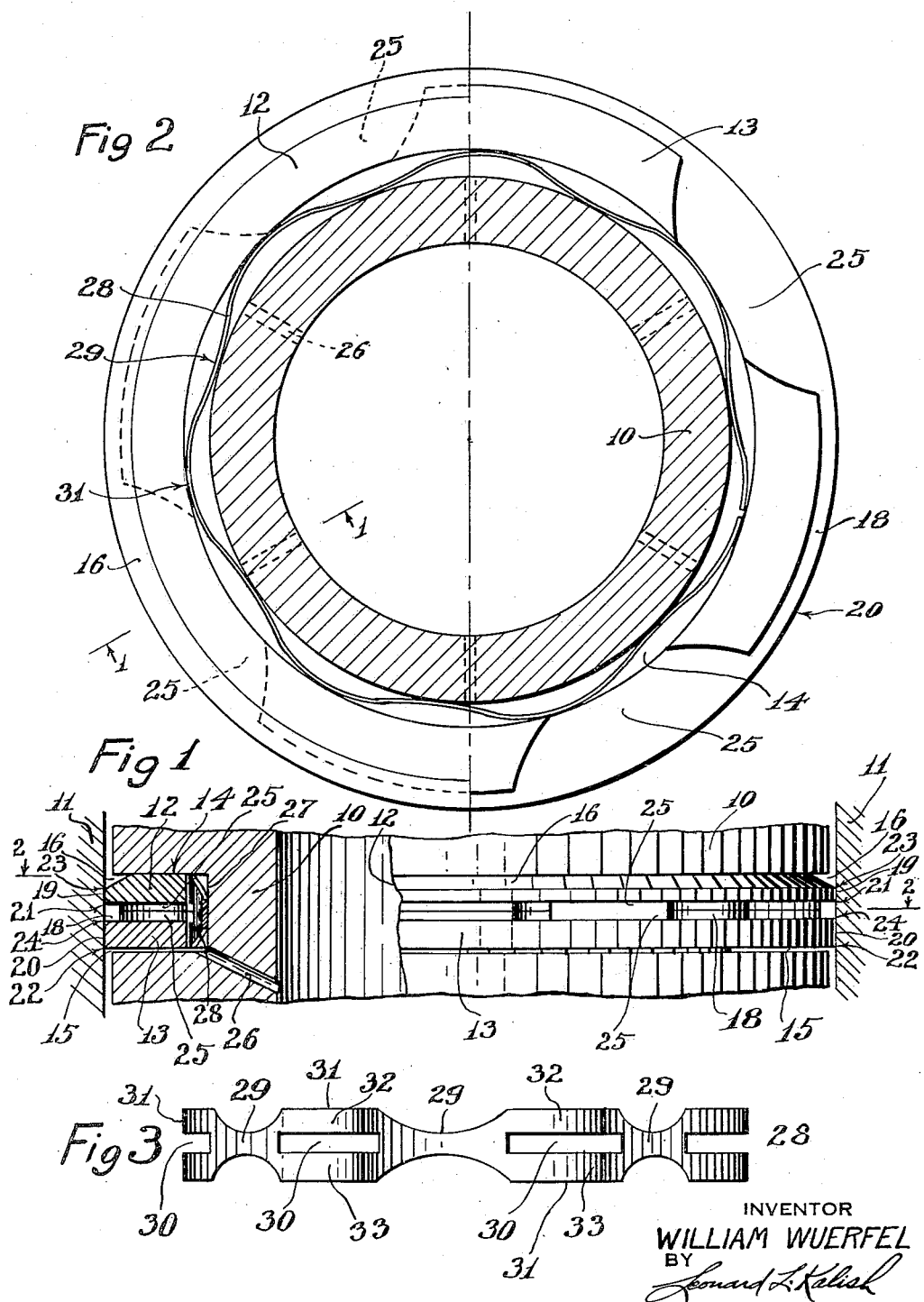

1,813,792

UNITED STATES PATENT OFFICE

WILLIAM WUERFEL, OF PHILADELPHIA, PENNSYLVANIA, ASSIGNOR TO WILKENING MANUFACTURING COMPANY, OF PHILADELPHIA, PENNSYLVANIA, A CORPORATION OF DELAWARE

PISTON RING

Application filed September 9, 1930. Serial No. 480,786. REISSUED

My invention relates to certain new and useful piston ring construction adapted particularly for controlling the oil within the cylinders of internal combustion engines and the like, and it relates more particularly to a piston ring construction wherein a plurality of split, annular rings are operatively disposed within a ring groove of the piston, and are so related to each other and to the ring groove, as to afford effective means for preventing excess oil from passing the piston into the combustion chamber; at the same time permitting a proper and sufficient lubrication of the cylinder wall and minimizing the frictional resistance and wear due to the rings, and which will also tend to effect a pressure proof seal between piston and cylinder.

This application is a continuation, in part, of my earlier filed copending applications, Serial Number 425,638 and Serial Number 456,350.

It is an object of my invention to provide an effective oil control ring which will be efficient in the conservation of the oil within the crank case of the engine, which will nevertheless permit sufficient lubrication, and which at the same time will afford a minimum frictional resistance to the reciprocation of the piston and a minimum wear and heating effect.

With the above and other objects in view, which will appear more fully from the following detailed description, my invention consists of a piston ring construction including a plurality of successive and superimposed split, annular, and operatively corelated and co-acting rings, operatively disposed within a single annular piston ring groove, with certain oil-retaining lateral or axial clearance; each of said plurality of coacting rings having an outer cylindrical cylinder contact or sealing surface of a width substantially less than the width of the corresponding ring and at least one of which is positioned on the lowermost part of the corresponding ring, and recesses or notches in, and extending transversely across, one or more of the abutting contiguous side walls or faces of said plurality of rings, and means operatively interposed between the inner cylindrical wall or "bottom" of ring groove, and the inner peripheral surfaces of each of said rings for exerting a uniform outward radial pressure upon each of said rings; and one of said rings presenting a plane side-seating surface in operative juxtaposition to the respective side-wall of the ring-receiving groove having an effective area substantially different from the effective area of the side-seating surface presented by the other ring in juxtaposition to the other side-wall of the ring-receiving groove, and the lower and upper, outer peripheral edges of the successive cylinder-contact or cylinder sealing surfaces presenting substantially different angles for producing substantially different "oil-scraping" effects during the two opposed strokes or reciprocatory movements of the piston.

My invention further consists of other features of construction which will appear more fully from the following detailed description of my invention and the accompanying drawings.

Figure 1 represents a side-elevational view, partly in section (on line 1—1 of Figure 2), with the fragmentary portion of the cylinder and piston.

Figure 2 represents a section taken generally on line 2—2 of Figure 1.

Figure 3 represents an elevation of the radial expander spring.

Figures 4 to 7 inclusive represent side-elevational views, similar to Figure 1, illustrating modified embodiments of my invention.

In carrying out my invention, I may utilize any conventional piston 10 adapted for operation within any conventional cylinder 11 and having any suitable number of ring-receiving grooves; said piston ring 10 and cylinder 11 being illustrated in the drawings in a fragmentary manner. My novel piston ring construction includes an upper and a lower split annular ring, designated by numerals 12 and 13, respectively, the aggregate over-all width of which corresponds generally with the width of the ring groove 14;— there being however a slight predetermined lateral or axial clearance between the rings and the side walls of the ring groove indicated at 15. The successive individual and separate annular rings are preferably, though not necessarily, of equal overall width and are each chamfered or otherwise set off or rabbeted along their upper and outer circumferential edges, as will be seen in each of Figures 1 and 4 to 7 inclusive.

The upper and lower chamfers 16 and 17 respectively, (Figs. 5, 6, and 7) or the upper chamfer 16 and the lower rabbeting groove 18, (Figures 1 and 4) form corresponding upper and lower annular oil-collecting chambers. These successive and spaced non-communicating annular oil-collecting chambers, formed by the upper and lower chamfers 16 and 17, as in the case of the forms of my invention shown in Figures 5, 6, and 7, or the upper chamfer 16 and lower rabbeting groove 18 in the modifications of my invention shown in Figures 1 and 4, occupy a substantial portion of the outer circumferential portion of the corresponding upper and lower rings, 12 and 13, respectively, thereby reducing the circumferential cylindrical contact or sealing portions 19 and 20 of the rings 12 and 13, to about one-half of the width of the corresponding rings.

It will thus be seen that below each of the circumferential annular oil chambers is a comparatively narrow annular cylindrical contact surface 19 and 20, respectively, adapted for contact with the cylinder wall 11.

It will be observed that the lower circumferential corners or edges 21 and 22 respectively, of each of the ring members 12 and 13, are formed of two surfaces at a right angle to each other, i. e., the lower side wall of the corresponding ring member and the cylindrical contact portions 19 and 20, respectively. The upper outer circumferential corners or edges 23 and 24 respectively, are, on the other hand, both formed of two surfaces meeting at an obtuse angle to each other as in the modifications illustrated in Figures 5, 6, and 7;—or at least the upper edges 23 are formed at an obtuse angle, while the lower edge 24 is formed at a right angle, as in the modifications shown in Figs. 1 and 4.

The effect of the pair of successive lower right angular edges, 21 and 22, and the pair of successive upper edges, one or both of which are at an obtuse angle, is to provide a greater oil scraping action on the downstroke of the piston and a lesser oil scraping action on the up-stroke of the piston;—with a resultant tendency to cause a general removal of oil from the cylinder wall in the direction of the crank case and with the further resultant tendency, on the downstroke, to gather a greater part of the affected oil in advance of the lower right angular edge 22; to gather a lesser part of the affected oil in advance of the lower edge 21, into the annular chamber 17 or 18, and to gather a still lesser part of the affected oil into the upper annular chamber 16. If the particular ring groove is not the uppermost groove of the piston, then a certain amount of oil is scraped into the upper annular chamber 16 by the ring above it in the next higher ring groove. A further result of this construction and relationship of constituent elements, is to effect an efficient lubrication of cylinder walls by reason of the release of some of the entrapped oil in the chambers 16 and 17 or 16 and 18, as the case may be.

In one or both of the abutting or contiguous side walls or faces of the rings 12 and 13, a series (any suitable number) of relatively shallow recesses 25 of generally uniform depth, are provided, extending generally transversely or radially across the inner side or face of the ring; with their outer ends terminating in the corner rabbeting or chamfer of the corresponding ring or in the cylindrical cylinder contact or cylinder sealing surface of the ring, and with their inner ends terminating on the inner circumference of the ring. Through these recesses 25 as well as possibly through the slight clearance indicated at 15, which clearance may shift from the bottom of the groove to the top of the groove or divide therebetween, (or which may also be between the two rings) a portion of the oil is transmitted in an inward radial direction into the ring groove 14 behind the rings 12 and 13, from whence the excess oil is drained back into the crank case through the drain hole 26 in the wall of the piston. It is this portion of the oil which otherwise enters the combustion chamber and results in what is generally referred to as "oil-pumping." The other portion of the oil adhering to the cylinder wall, is scraped down and into the crankcase by the lowermost edge 22 of the ring 13.

The recesses 25 are preferably of uniform depth and made with outwardly divergent side walls or edges as indicated in Fig. 2. The outwardly divergent side walls or edges of the recesses 25 are convexly curved and preferably have a common centre at a point outside of the radially outermost boundary of the ring.

Intermediate the inner circumferential walls of the rings 12 and 13, and the inner wall or "bottom" 27 of the ring groove 14, a radially acting flat ribbon expander spring 28 is provided, of the general type disclosed in my Patent Number 1,707,035, preferably having a sinuous corrugated formation giving rise to opposite and staggered contact portions adapted for contacting with the inner peripheries of the rings 12 and 13 and the "bottom" 27, respectively, of the ring groove 14. The expander spring 28 is preferably narrowed at the inner contact points 29 thereof, and slotted longitudinally by means of the slots 30 at the outer contact portions 31 thereof. By reason of the slotting of the outer contact portions 31, two independently flexible contact points 32 and 33 are provided for contacting engagement with the two separate rings 12 and 13 respectively. This independent flexibility and resultant equalization is further augmented by the narrowing at the inner points of contact 29. This narrowing also reduces the impedance to the passage of the oil. Due to the limited independent flexibility of the upper and lower contact points 32 and 33, the rings 12 and 13 are urged outwardly by the expander spring 28 with an equalized or compensated outward radial pressure. Thus any difference in over-all radial width of the rings 12 and 13 or any variation in the diameter of the cylinder in an axial direction, will not cause a firmer contact between the cylinder wall and one of the rings than between the cylinder wall and the other of the two rings, because any such slight difference is compensated for or equalized by the limited independent flexibility of the upper and lower rings 12 and 13, the oil-scraping action of the upper and lower edges of the two rings may be maintained free of any variation which might otherwise be occasioned by difference in contact pressure between the rings and cylinder wall.

The radial expander spring 28 may be used to expand the rings 12 and 13, independently of any other expanding means, as for instance a tension in the rings, or said radial expander spring 28 may be used merely to augment the outward tension set into the body of the rings by any suitable means, as for instance the heat-shaping or heat-tensioning disclosed in the Pedrick and Kolb Patent Number 1,284,439. Thus the split annular rings 12 and 13 may be set to give an outward tension, by heat-shaping them, or otherwise, and a relatively light tensioned radial expander spring 28 may be used to augment the tension set into the rings, and to center such rings with respect to the piston. By thus centering the rings 12 and 13 with respect to the piston, the various oil controlling functions of the rings and their constituent elements, are made more uniform throughout the entire periphery thereof.

According to my present invention, the clearance between the aggregate over-all width of the two rings 12 and 13 and the width of the groove 14 is made about five-thousandths of an inch (more or less). This clearance, when used in conjunction with the motor oils of a viscosity within the viscosity range commonly employed for internal combustion engines, will produce a sufficient radial passage-way between the outer and inner circumference of the rings and will at the same time maintain a film or layer of oil, by reason of the viscosity, cohesion and adhesion of the oil, and possibly also by an effect, similar to, if not in fact of the capillary action due to the surface tension of the oil in the comparatively narrow clearance. Because of the greater side contact or side-seating surface between the lower face of the lower side ring 13 and the adjacent side wall of the ring receiving groove, than between the upper side face or side-seating surface of the upper ring 12 and the adjacent side wall of the ring receiving groove, the clearance will tend to form more between the lower ring and the adjacent lower side wall of the ring groove, as indicated particularly at 15 in Figure 1. This coacts with the lower scraping edge 22 of the lower ring 13 to convey a portion of the oil from the cylinder wall into the rear of the ring groove 14 to the drain holes 26. The oil affected by the edges 21 and 24 is conveyed to the rear of the oil groove by the recesses 25. The clearance 15 is greater than that required to "fit" the width of the ring groove;—the normal "fit" clearance being about one-thousandth or one and one-half thousandths, while the clearance forming a part of my present invention is approximately five-thousandths of an inch (more or less), sufficient to maintain the layer of oil, which will not only afford a draining means but which will also afford a cushion for the rings.

The result of this novel construction, as pointed out hereinabove, is a highly efficient oil controlling or oil conserving means, which will at the same time maintain a sufficient and proper lubrication of the cylinder wall and reduce to a minimum the frictional resistance and wear incidental to the action of the rings.

Having thus described my invention, what I hereby claim as new and desire to secure by Letters Patent, is:—

1. The combination with a cylinder, of a piston adapted to travel therein, having an annular ring-receiving groove, the defining walls of which are integral with each other, and of an axially divided multi-piece, split, annular metallic piston-ring having an outer annular oil-collector groove in the outer cylindrical surface thereof, a plurality of peripherally distributed generally radial oil passageways, extending from said outer annular oil-collector groove through the piston-ring, into an oil chamber formed between the inner peripheral surface of the piston-ring and the inner wall of the ring-receiving groove; the dimensions of said radial passageways in a direction generally parallel to the periphery of the ring being greater than their dimensions in a direction generally parallel to the axis of the ring, and lateral or axial clearance between piston ring and ring-receiving groove in excess of the normal clearance required to fit the piston-ring into said groove, sufficient to permit the formation and maintenance of a layer of oil in said lateral clearance between piston-ring and ring-receiving groove;—each of said ring members having an outer side-seating surface for side-seating engagement with the respective side-walls of the ring-receiving groove, and the effective area of one of said two side-seating surfaces being substantially less than the effective area of the other of said side-seating surfaces.

2. The combination with a cylinder and a piston adapted to travel therein, the latter having an annular ring-receiving groove therein, the defining walls of which are integral with each other, of an axially divided two-piece, split, annular cast-iron piston-ring having an outer annular oil-collector groove in the outer cylindrical surface thereof, divided between the two annular ring members comprising said piston-ring, a series of peripherally spaced and generally radial oil passageways extending from said outer annular oil-collector groove through the piston-ring, into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, and lateral or axial clearance between piston-ring and ring-receiving groove in excess of the normal clearance required to fit the piston-ring into the groove, sufficient to permit the formation and maintenance of a layer of oil, in said lateral clearance between piston-ring and ring-receiving groove;—each of said ring members having an outer side-seating surface for side-seating engagement with the respective side-walls of the ring-receiving groove, and the effective area of one of said two side-seating surfaces being substantially less than the effective area of the other of said side-seating surfaces.

3. The combination with a cylinder, of a piston adapted to travel therein, the latter having an annular ring-receiving groove therein, the defining walls of which are integral with each other, and of an axially divided multi-piece, split annular piston ring, having a plurality of generally radial oil passageways peripherally distributed and extending from the outer periphery of said piston ring to the inner periphery thereof to an oil chamber formed between the inner peripheral surface of the piston ring and the inner wall of the ring-receiving groove, the outer ends of said generally radial oil passageways forming oil collector chambers to gather oil from the surface of the cylinder, and the dimensions of said radial passageways in a direction generally parallel to the periphery of the ring being greater than their dimensions in a direction generally parallel to the axis of the ring, means extending through the piston wall for draining the excess oil gathered from the cylinder wall by said ring, and lateral or axial clearance between piston ring and ring-receiving groove, sufficiently in excess of the normal clearance required to fit the piston ring into said ring-receiving groove, to permit the formation and maintenance of a layer of oil in said lateral clearance between piston-ring and ring-receiving groove;—each of said ring members having an outer side-seating surface for side-seating engagement with the respective side-walls of the ring-receiving groove, and the effective area of one of said two side-seating surfaces being substantially less than the effective area of the other of said side-seating surfaces.

4. The combination with a cylinder, of a piston adapted to travel therein, the latter having an annular ring-receiving groove therein, the defining walls of which are integral with each other, and of an axially divided two-piece, split annular metallic piston ring, having a series of peripherally spaced and generally radial oil passageways extending through the ring with their outer ends opening in the outer peripheral cylinder-contact surface of the piston ring and serving to scrape oil from the cylinder wall and to gather the said oil and to pass the same through the ring into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, and lateral or axial clearance between piston ring and ring-receiving groove, sufficiently in excess of the normal clearance required to fit the piston ring into the groove, to permit the formation and maintenance of a layer of oil in said lateral clearance between piston-ring and ring-receiving groove, and oil drainage means extending through the piston wall to drain the excess oil gathered by the piston ring;— each of said ring members having an outer side-seating surface for side-seating engagement with the respective side-walls of the ring-receiving groove, and the effective area of one of said two side-seating surfaces being substantially less than the effective area of the other of said side-seating surfaces.

5. The combination with a cylinder, of a piston adapted to travel therein, having an annular ring-receiving groove, the defining walls of which are integral with each other, and of an axially divided multi-piece, split, annular metallic piston-ring, each ring member comprising said multi-piece piston-ring, having an annular cylindrical cylinder-contact surface portion, continuous and uninterrupted annularly, except for the very slight interruption at the split, the axial width of said continuous and annularly uninterrupted cylinder-contact surface portions being less than the over-all axial widths of said ring members, respectively, a series of peripherally spaced and generally radial oil passageways extending through the piston-ring, having their outer ends intermediate said continuous and annularly uninterrupted cylinder-contact surface portions of the several ring members, and having their inner ends extending to an oil chamber formed between the inner peripheral surface of the piston ring and the bottom of the ring-receiving groove, the dimensions of said radial oil passageways in a direction generally parallel to the periphery of the ring being greater than their dimensions in a direction generally parallel to the axis of the ring, lateral or axial clearance between piston-ring and ring-receiving groove sufficiently in excess of the normal clearance required to fit the piston-ring into the ring-receiving groove, to permit the formation and maintenance of a layer of oil in said lateral clearance between piston-ring and ring-receiving groove, and means extending through the piston wall for draining the excess oil gathered by said piston-ring, from the surface of the cylinder;—each of said ring members having an outer side-seating surface for side-seating engagement with the respective side-walls of the ring-receiving groove, and the effective area of one of said two side-seating surfaces being substantially less than the effective area of the other of said side-seating surfaces.

6. The combination with a cylinder, of a piston adapted to travel therein, having an annular ring-receiving groove, the defining walls of which are integral with each other, and of an axially divided two-piece, split, annular metallic piston-ring, having an outer annular oil-collector groove in the outer cylindrical cylinder-contact surface thereof, divided between the two annular ring members comprising said piston-ring, a series of peripherally spaced and generally radial oil passage recesses extending across the juxtaposed, abutting and contiguous faces of each of the two ring members, from said outer annular oil-collector groove, to an oil chamber formed between the inner peripheral surface of the piston-ring and the bottom of the ring-receiving groove, the dimensions of said generally radial recesses in a direction generally parallel to the periphery of the ring being greater than their dimensions in a direction generally parallel to the axis of the ring, and lateral or axial clearance between the piston-ring and ring-receiving groove, sufficiently in excess of the normal clearance required to fit the piston-ring into the ring-receiving groove, to permit the formation and maintenance of a layer of oil in said lateral clearance between piston-ring and ring-receiving groove, and means extending through the piston wall for draining the excess oil gathered by said piston-ring from the cylinder wall;—each of said ring members having an outer side-seating surface for side-seating engagement with the respective side-walls of the ring-receiving groove, and the effective area of one of said two side-seating surfaces being substantially less than the effective area of the other of said side-seating surfaces.

7. The combination with a cylinder, of a piston adapted to travel therein, having an annular ring-receiving groove, the defining walls of which are integral with each other, and of an axially divided multi-piece, split, annular metallic piston-ring having an outer annular oil-collector groove in the outer cylindrical surface thereof, a plurality of peripherally distributed generally radial oil passageways, extending from said outer annular oil-collector groove through the piston-ring, into an oil chamber formed between the inner peripheral surface of the piston-ring and the inner wall of the ring-receiving groove; the dimensions of said radial passageways in a direction generally parallel to the periphery of the ring being greater than their dimensions in a direction generally parallel to the axis of the ring, lateral or axial clearance between piston ring and ring-receiving groove in excess of the normal clearance required to fit the piston-ring into said groove, sufficient to permit the formation and maintenance of a layer of oil in said lateral clearance between piston-ring and ring-receiving groove, and a single expander spring intermediate the inner peripheral wall of the ring-receiving groove and each of said ring members for exerting a circumferentially distributed outward radial pressure upon each of said ring members;— each of said ring members having an outer side-seating surface for side-seating engagement with the respective side-walls of the ring-receiving groove, and the effective area of the upper of said two side-seating surfaces being substantially less than the effective area of the other of said side-seating surfaces.

8. The combination with a cylinder and a piston adapted to travel therein, the latter having an annular ring-receiving groove therein, the defining walls of which are integral with each other, of an axially divided two-piece, split, annular cast-iron piston-ring having an outer annular oil-collector groove in the outer cylindrical surface thereof, divided between the two annular ring members comprising said piston-ring, a series of peripherally spaced and generally radial oil passageways extending from said outer annular oil-collector groove through the piston-ring, into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, lateral or axial clearance between piston-ring and ring-receiving groove in excess of the normal clearance required to fit the piston-ring into the groove, sufficient to permit the formation and maintenance of a layer of oil, in said lateral clearance between piston-ring and ring-receiving groove, and a single expander spring intermediate the inner peripheral wall of the ring-receiving groove and each of said ring members for exerting a circumferentially distributed outward radial pressure upon each of said ring members;—each of said ring members having an outer side-seating surface for side-seating engagement with the respective side-walls of the ring-receiving groove, and the effective area of one of said two side-seating surfaces being substantially less than the effective area of the other of said side-seating surfaces.

9. The combination with a cylinder, of a piston adapted to travel therein, the latter having an annular ring-receiving groove therein, the defining walls of which are integral with each other, and of an axially divided multi-piece, split, annular piston ring, having a plurality of generally radial oil passageways peripherally distributed and extending from the outer periphery of said piston ring to the inner periphery thereof to an oil chamber formed between the inner peripheral surface of the piston ring and the inner wall of the ring-receiving groove, the outer ends of said generally radial oil passageways forming oil collector chambers to gather oil from the surface of the cylinder, and the dimensions of said radial passageways in a direction generally parallel to the periphery of the ring being greater than their dimensions in a direction generally parallel to the axis of the ring, means extending through the piston wall for draining the excess oil gathered from the cylinder wall by said ring, lateral or axial clearance between piston ring and ring-receiving groove, sufficiently in excess of the normal clearance required to fit the piston ring into said ring-receiving groove, to permit the formation and maintenance of a layer of oil in said lateral clearance between piston-ring and ring-receiving groove; and a single expander spring intermediate the inner peripheral wall of the ring-receiving groove and each of said ring members for exerting a circumferentially distributed outward radial pressure upon each of said ring members;—each of said ring members having an outer side-seating surface for side-seating engagement with the respective side-walls of the ring-receiving groove, and the effective area of the upper of said two side-seating surfaces being substantially less than the effective area of the other of said side-seating surfaces.

10. The combination with a cylinder, of a piston adapted to travel therein, the latter having an annular ring-receiving groove therein, the defining walls of which are integral with each other, and of an axially divided two-piece, split annular metallic piston ring, having a series of peripherally spaced and generally radial oil passageways extending through the ring with their outer ends opening in the outer peripheral cylinder-contact surface of the piston ring and serving to scrape oil from the cylinder wall and to gather the said oil and to pass the same through the ring into an oil chamber formed between the inner peripheral surface of the piston-ring and the bottom of the ring-receiving groove, the dimensions of said radial passageways in a direction parallel to the periphery of the ring being greater than their dimensions in a direction parallel to the axis of the ring, lateral or axial clearance between piston ring and ring-receiving groove, sufficiently in excess of the normal clearance required to fit the piston ring into the groove, to permit the formation and maintenance of a layer of oil in said lateral clearance between piston-ring and ring-receiving groove, and oil drainage means extending through the piston wall to drain the excess oil gathered by the piston ring, and a single expander spring intermediate the inner peripheral wall of the ring-receiving groove and each of said ring members for exerting a circumferentially distributed outward radial pressure upon each of said ring members;—each of said ring members having an outer side-seating surface for side-seating engagement with the respective side-walls of the ring-receiving groove, and the effective area of one of said two side-seating surfaces being substantially less than the effective area of the other of said side-seating surfaces.

11. The combination with a cylinder, of a piston adapted to travel therein, having an annular ring-receiving groove, the defining walls of which are integral with each other, and of an axially divided multi-piece, split, annular metallic piston-ring, each ring member comprising said multi-piece piston-ring, having an annular cylindrical cylinder-contact surface portion, continuous and uninterrupted annularly, except for the very slight interruption at the split, the axial width of said continuous and annularly uninterrupted cylinder-contact surface portions being less than the over-all axial widths of said ring members, respectively, a series of peripherally spaced and generally radial oil passageways extending through the piston-ring, having their outer ends intermediate said continuous and annularly uninterrupted cylinder-contact surface portions of the several ring members, and having their inner ends extending to an oil chamber formed between the inner peripheral surface of the piston ring and the bottom of the ring-receiving groove, the dimensions of said radial oil passageways in a direction generally parallel to the periphery of the ring being greater than their dimensions in a direction generally parallel to the axis of the ring, lateral or axial clearance between piston-ring and ring-receiving groove sufficiently in excess of the normal clearance required to fit the piston-ring into the ring-receiving groove, to permit the formation and maintenance of a layer of oil in said lateral clearance between piston-ring and ring-receiving groove, a single expander spring intermediate the inner peripheral wall of the ring-receiving groove and each of said ring members for exerting a circumferentially distributed outward radial pressure upon each of said ring members, and means extending through the piston wall for draining the excess oil gathered by said piston-ring, from the surface of the cylinder;—each of said ring members having an outer side-seating surface for side-seating engagement with the respective side-walls of the ring-receiving groove, and the effective area of the upper of said two side-seating surfaces being substantially less than the effective area of the other of said side-seating surfaces.

12. The combination with a cylinder, of a piston adapted to travel therein, having an annular ring-receiving groove, the defining walls of which are integral with each other, and of an axially divided two-piece, split, annular metallic piston-ring, having an outer annular oil-collector groove in the outer cylindrical cylinder-contact surface thereof, divided between the two annular ring members comprising said piston-ring, a series of peripherally spaced and generally radial oil passage recesses extending across the juxtaposed, abutting and contiguous faces of each of the two ring members, from said outer annular oil-collector groove, to an oil chamber formed between the inner peripheral surface of the piston-ring and the bottom of the ring-receiving groove, the dimensions of said generally radial recesses in a direction generally parallel to the periphery of the ring being greater than their dimensions in a direction generally parallel to the axis of the ring, lateral or axial clearance between the piston-ring and ring-receiving groove, sufficiently in excess of the normal clearance required to fit the piston-ring into the ring-receiving groove, to permit the formation and maintenance of a layer of oil in said lateral clearance between piston-ring and ring-receiving groove, a single expander spring intermediate the inner peripheral wall of the ring-receiving groove and each of said ring members for exerting a circumferentially distributed outward radial pressure upon each of said ring members, and means extending through the piston wall, for draining the excess oil gathered by said piston-ring from the cylinder wall;—each of said ring members having an outer side-seating surface for side-seating engagement with the respective side-walls of the ring-receiving groove, and the effective area of one of said two side-seating surfaces being substantially less than the effective area of the other of said side-seating surfaces.

In testimony whereof I have hereunto set my hand this 8th day of July, 1930.

WILLIAM WUERFEL.